United States Patent
Saville (10) Patent No.: US 10,426,127 B2
(45) Date of Patent: Oct. 1, 2019

(54) CAMERA SYSTEM, ANIMAL RELATED SYSTEM THEREWITH, AND METHOD TO CREATE 3D CAMERA IMAGES

(71) Applicant: LELY PATENT N.V., Maassluis (NL)

(72) Inventor: Kate Saville, Schiedam (NL)

(73) Assignee: LELY PATENT N.V., Maassluis (NL)

( * ) Notice: Subject to any disclaimer, the term of this patent is extended or adjusted under 35 U.S.C. 154(b) by 223 days.

(21) Appl. No.: 14/759,442

(22) PCT Filed: Jan. 14, 2014

(86) PCT No.: PCT/NL2014/050010
§ 371 (c)(1),
(2) Date: Jul. 7, 2015

(87) PCT Pub. No.: WO2014/119997
PCT Pub. Date: Aug. 7, 2014

(65) Prior Publication Data
US 2015/0342139 A1 Dec. 3, 2015

(30) Foreign Application Priority Data

Jan. 31, 2013 (NL) ........................................ 2010213

(51) Int. Cl.
*A01J 5/017* (2006.01)
*H04N 13/254* (2018.01)
(Continued)

(52) U.S. Cl.
CPC .............. *A01J 5/017* (2013.01); *A01J 5/0175* (2013.01); *G01B 11/2545* (2013.01);
(Continued)

(58) Field of Classification Search
None
See application file for complete search history.

(56) References Cited

U.S. PATENT DOCUMENTS 4,429,328 A * 1/1984 Jones, Jr. ................ G03B 35/16
348/42
6,005,987 A * 12/1999 Nakamura ............ G06T 3/4038
348/42
(Continued)

FOREIGN PATENT DOCUMENTS

EP 0 837 428 A2 4/1998
WO 2010 031632 3/2010

OTHER PUBLICATIONS

International Search Report dated Apr. 11, 2014, in PCT/NL2014/050010 filed Jan. 14, 2014.

*Primary Examiner* — Bernard Krasnic
(74) *Attorney, Agent, or Firm* — Oblon, McClelland, Maier & Neustadt, L.L.P.

(57) ABSTRACT

A camera system, an animal related system therewith, and a method for creating a 3D image of an object, the camera device including a 3D camera device to capture images of the object, a processing device to determine a 3D image from the captured images, and a mover device to move at least a part of the 3D camera device with a reciprocating movement. Providing a movement to the camera device provides a less noisy and more accurate 3D image of the object, in particular in a case of a soiled camera device.

19 Claims, 4 Drawing Sheets

(51) Int. Cl.
*H04N 5/225* (2006.01)
*H04N 13/296* (2018.01)
*G01B 11/25* (2006.01)
*H04N 13/239* (2018.01)

(52) U.S. Cl.
CPC ......... *H04N 5/2256* (2013.01); *H04N 13/239* (2018.05); *H04N 13/254* (2018.05); *H04N 13/296* (2018.05)

(56) References Cited

U.S. PATENT DOCUMENTS

| | | | | |
|---|---|---|---|---|
| 2005/0257748 | A1* | 11/2005 | Kriesel | A01K 11/008 119/51.02 |
| 2007/0215052 | A1* | 9/2007 | Metcalfe | A01J 5/0175 119/14.08 |
| 2010/0171037 | A1* | 7/2010 | Bierhoff | H01J 37/16 250/310 |
| 2011/0085027 | A1* | 4/2011 | Yamashita | G06T 5/003 348/49 |
| 2012/0033954 | A1* | 2/2012 | Wakamatsu | G02B 27/646 396/55 |
| 2012/0113280 | A1 | 5/2012 | Stupak et al. | |
| 2012/0274243 | A1 | 11/2012 | Sumioka | |
| 2012/0275662 | A1 | 11/2012 | Hofman et al. | |
| 2014/0247323 | A1* | 9/2014 | Griffis | H04N 5/23238 348/36 |
| 2014/0350410 | A1* | 11/2014 | Axelsson | A01K 29/005 600/476 |

* cited by examiner

CAMERA SYSTEM, ANIMAL RELATED SYSTEM THEREWITH, AND METHOD TO CREATE 3D CAMERA IMAGES

The present invention relates to a camera system, an animal related system therewith and a method to create 3D images. In particular, the invention relates to a camera system configured to create 3D images of an object, a 3D camera device to capture images of the object, and a processing device operatively connected to the 3D camera device and arranged to determine a 3D image from the captured images, wherein the 3D camera device comprises at least two components, a first component comprising a first 2D receiver arranged to capture images of the object, and a second component comprising at least one of a second 2D receiver arranged to capture images of the object, and an illuminating unit configured to project light on the object.

Such a 3D camera is for example based on sensor technology by PrimeSense Ltd., Tel-Aviv, Israel, and for example marketed in the Kinect™ for Microsoft Corporation, and described in patent applications WO 2007/043036, WO2007/105205, US2010/0290698, US2010/118123. Reference is made to this sensor technology and these documents for technical details of said sensor technology.

This type of 3D camera devices is suitable to determine a position of an object, such as a person. Also movements of the object can be followed at a relatively high rate. The camera device is successfully implemented in a computer game console, where real time movements of a person are used for control of a computer game.

It may be desirable to use such technique in other applications where (near) real time three-dimensional positions or movements of objects should be followed. One such application is the determination of a teat position of a cow when placing teat cups on a teat. Since the cow, or any other dairy animal, will usually not stand still in a milk box of an automatic milking device, the connection of teat cups to the teats of the animal may be a challenging task. The availability of real time 3D images of the back end of a cow may be helpful in connecting the teat cups to the teats of a dairy animal.

Therefore, a 3D camera device as described above may be useful for e.g. the implementation of a milking process in a milking box. Other uses could be monitoring, the determination of body condition score of an animal based on 3D images of the animal and so on.

However, a drawback of the known camera device is that the image quality of the images created by the camera system is susceptible to contamination, in particular the outer surface of the 3D camera device through which the images are captured. These outer surfaces may for instance be formed by a lens element or transparent cover of the 3D camera device.

As a result, the camera system may be less suitable for environments in which contamination of the outer surfaces is likely to occur, for example an environment where larger animals, such as cows are present. This makes the camera system suitable to determine a position of a cow or parts thereof, for example the teats of a cow, in a reliable manner without excessive cleaning of the outer surfaces.

It is an object of the invention to provide a camera system of the above-mentioned type which is less sensitive to contamination. It is a further object of the invention to provide such camera system suitable to be used for determination of a position of an animal or a part thereof in a relatively dirty environment, such as a milking box, or more generally an animal housing.

The invention provides a camera system configured to create 3D images of an object, comprising a 3D camera device to capture images of the object, and a processing device operatively connected to the 3D camera device and arranged to determine a 3D image from the captured images, wherein the 3D camera device comprises at least two components, a first component comprising a first 2D receiver arranged to capture images of the object, and a second component comprising at least one of a second 2D receiver arranged to capture images of the object, and an illuminating unit configured to project light on the object, characterized in that the camera system comprises a mover device configured to move at least one of said components with a reciprocating movement during capturing of images, in particular a translating movement.

Herein, a 2D receiver is understood to be a 2D array of receivers. The receivers themselves may be any type of receiver, such as optical receivers. The 2D receiver as a whole may for example be a video camera (ccd or the like), a time-of-flight sensor, in which the individual receivers provide distance information, or the like. It has unexpectedly been found that a reciprocating movement of the camera device, or a component thereof, with respect to the object of which a 3D image is desired, may substantially improve the image quality. The image quality may in particular improve in case of contamination of the outer surface(s) of the 3D camera device. Without wishing to be tied to an explanation, the applicant believes that, through the movement, a plurality of images is used in the processing before outputting the 3D image. In any case, it has been found that the noise in the outputted image is reduced considerably with the present invention.

According to the invention, the 3D camera device comprises at least two components, a first one comprising a 2D receiver. The second one comprises at least one of a second 2D receiver and an illuminating unit configured to project light on the object.

The former of the above possibilities relates in particular to a twin camera device, in which triangulation or any other stereoscopic calculation is used to determine the 3D image. Thereto, the (at least) two 2D receivers each comprise a video camera, the processing device being arranged to compare the images from the video cameras and to determine the 3D image by means of stereoscopy, in particular triangulation. Herein, too, it is assumed that the signal-to-noise ratio and the accuracy are improved by using (slightly) shifted images.

It is remarked that US2012/0274243 discloses a vibration apparatus for removing dust from an optical element. In this known device, the vibration is applied when dirt was detected or inferred, and only between the taking of images, not during imaging. Furthermore and contrarily, in the present invention the vibration is applied during capturing of images, while it is not at all aimed at to remove dirt by the reciprocating movement.

It is further remarked that e.g. NL1015559 discloses a teat position determination system in which a single moveable camera takes an image at two positions, which two images are then processed into a three-dimensional image. This camera is also moved, but is based on a different system. First of all, in the present system there are two 2D receivers that together provide the images to determine a 3D image. Having two such cameras would remove the need for displacing these cameras in the known system altogether. Still, and contrarily, the present invention has this movability, to its advantage as described. It is furthermore remarked that such known systems require a sufficient displacement for the images to be sufficiently different to allow a reliable stereoscopic calculation. Contrarily, in the present invention this displacement should not be large, but rather small, as will be explained further below.

The latter of the above possibilities according to the present invention relates to a 3D camera device with a 2D receiver and an illuminating unit configured to project light on the object. This could simply be a light source, enabling the 2D receiver to capture images even under low ambient light conditions, or even a source of a particular optical radiation, such as more in particular (near) infrared light, as this makes the 2D receiver less susceptible to ambient light noise, and is less disturbing for any animals. In embodiments, the illuminating unit is arranged to project a light pattern on the object, and the first component is arranged to capture images of the object including a reflected light pattern. The light pattern comprises in particular a structured light pattern, such as more in particular a speckle pattern. Herein, projecting a light pattern on the object means that the light pattern is projected into a part of space expected to contain the object. Of course, there will be a reflected pattern only if that part of space actually contains an object. Such patterns may comprise patterns of lighter and darker parts, generated by means of e.g. a laser and a piece of ground glass, all according to the technology as disclosed in e.g. the patent documents mentioned in the introductory part, and relating in particular to cameras by the company PrimeSense, Ltd., such as those used in the Kinect™. It was found in experiments that the mover device improved image quality rather much. Thus the images on the basis of which to determine the 3D image were also much improved, and thereby of course also the accuracy of determining subsequently the position of e.g. a teat or a cow's back end.

It is noted that it is also possible to use other patterns than a speckle pattern, or even to configure the illumination unit as a light source for emitting e.g. pulses for use in a time-of-flight system. Illumination is therefore to be understood as comprising visual and infrared light.

In an embodiment, the mover device is configured to move the first component and the second component simultaneously with the same reciprocating movement, and in particular move the 3D camera device as a whole with said reciprocating movement. In other words, in the latter case the mover device moves the camera device as a whole. More generally, however, it would suffice if the first and second component, at least those involved in capturing the images for determining the 3D image, are moved simultaneously. Contamination on the outer surfaces of 3D camera device or its components may result in a lower image quality. A reciprocating movement of the 3D camera device or its components may have an improving effect on the image quality obtained by the camera device. Furthermore, simultaneous movement with the same reciprocating movement ensures that the spatial relationship between the components is maintained. Advantageously, the components of the 3D camera device are comprised or mounted as a unit or in a unitary housing, such as to be connected to each other in a fixed spatial relationship. This simplifies, or rather avoids, calculations to determine the mutual positions as a function of time, in order to determine the position of the animal part from the generated 3D images.

In an embodiment, the processing device comprises a data input to receive movement data of said reciprocating movement, and the processing device is configured to determine the 3D image from the captured images and the movement data. By taking into account the movement data of the 3D camera device or its components, i.e. data representative for the movement of the 3D camera device or its components, the movement thereof with respect to the object of which a 3D image is created can be compensated when processing the captured images into the 3D image. These movement data may be measured by means of accelerometers and so on, or may be retrieved from a look-up table, for example based on a predetermined setting of the movement and corresponding calibrated predetermined or standard measurements of the movement mode of the device. As a result of the compensation, the image quality can be improved further.

In an embodiment, a direction of the reciprocating movement is substantially perpendicular to an (average) projecting direction of the illuminating unit and/or a capturing direction of said first or second 2D receiver, or at least substantially perpendicular to an angle bisector of the angle between the average projecting direction and the average capturing direction, or between the average capturing directions of the first and second 2D receivers. Then, the measured distances will not change, or only very slightly. "Substantially perpendicular" is intended to mean subtending an angle of at least 70° up to 90°, and "capturing direction" is intended to include "viewing direction". Herein, it is noted that the average projecting direction and the average capturing direction subtend an angle therebetween in those cases in which the illuminating unit is not positioned at the same location as the 3D camera sensor, i.e. in most cases. However, even in those cases the angle therebetween will often if not always be relatively small, such as at most 15°, without this being a strict limit. Normally the illuminating unit, 2D receiver and/or the 3D camera device as a whole comprise a transparent outer surface through which radiation, such as the projected and/or reflected light patterns, can be transmitted. Since contamination on these transparent outer surfaces may hinder transmission of (part of) the radiation, parts of the object may not be represented (correctly) in the images as captured by the 3D camera device. By movement of the illuminating unit substantially perpendicular to a projecting direction and/or movement of the 3D camera device substantially perpendicular to a capturing direction of said 3D camera device or 2D receiver thereof, the hindering effect of the contamination may be avoided efficiently. Again without wishing to be tied to a possible explanation, it is deemed to work in much the same way as when someone is looking through a hedge. When standing still, part of the view will be blocked by leaves and branches. However, when sufficiently quickly moving the head from side to side, i.e. perpendicularly, the view is completed by the brain, supposedly by combining different partial images. "Sufficiently quickly" is considered to be with respect to the processing frequency of the brain, i.e. at least about 16 images/second. Similarly, it is considered that providing a number of slightly shifted images, thus e.g. having slightly different parts of the reflected illumination pattern, to the processing unit allows the latter to process those images into a "better", more accurate, less noisy 3D image. Herein, it is assumed that the processing unit is arranged to use more than one captured image for processing these into the 3D image. It is noted that this principle is completely different, in aspect and aim, from the principle used in US2012/0274243, where a vibration apparatus is used to generate vibrations to strip off dust and dirt from an optical component, but not during capturing images.

It is remarked that in embodiments, the transparent outer surface through which the radiation, such as the (reflected) illumination pattern, can be transmitted is arranged substantially perpendicular to the projection direction and capturing direction, respectively. In such embodiments, the movement substantially perpendicular to the projecting direction and/or capturing direction will be substantially parallel to the plane of the transparent outer surface. Further, when the transparent outer surface(s) through which said radiation is transmitted is not arranged substantially perpendicular to the projection direction and capturing direction, respectively, a direction of the reciprocating movement may be substantially perpendicular to the plane of the transparent outer surfaces of the illuminating unit and/or the 3D camera device.

Further, it is remarked that the outer surface of the illuminating unit and/or 2D receiver may be formed by an outer element of the illuminating unit and/or 2D receiver, respectively, or a common part, such as a transparent housing part.

In an embodiment, the reciprocating movement is a translating movement. A translating movement is a simple perpendicular movement and has been found to be a very efficient to improve image quality when image quality has decreased as a result of contamination on the camera system. It is also easily compensated for in calculations of the correct positions in the 3D image. However, it is also noted that it is not always necessary to correct these distances, as it was found that the accuracy in the distances, due to less noise and better overall 3D image quality, is better than the decrease due to the reciprocating movement. The translating movement could be in a single linear direction, which is again the simplest translating movement. However, it is also possible to vary the direction between successive translations, such as alternating vertical and horizontal translations, or a direction that slowly rotates in a plane perpendicular to the mentioned (average) projecting direction. In all, that would mean that the translating movement becomes a curved movement. However, if the translation is much faster than the rotation, e.g. with a frequency ratio of at least 10, then it is still considered a translation. Having a translation in more than one direction offers the advantage that elongate contaminations parallel to one translation, and happening to block parts of the pattern, may be rendered less hindering by having a translation in at least one other direction. It is noted that other movements, such as rotational movements, elliptical movements, swivelling movements or even random movements, are also possible. Still, however, it is preferable when these movements are substantially perpendicular to the (average of or the angle bisector of) projecting and/or capturing directions. In general, a reciprocating movement is a movement in which the average position remains the same in the course of time.

In an embodiment, it was found to be advantageous when an amplitude of the reciprocating movement is below 5 mm, preferably below 2 mm. It has been found that the amplitude of the reciprocating movement can be kept relatively low while still providing an improved 3D image quality. It was found that having too large an amplitude, in particular about 5 mm or more, resulted in an even "cleaner" image, that was however distorted, and showed ghost images of objects at different positions and the like. It is also noted that having a small amplitude, such as below 5 mm, is much too small to allow a reliable 3D imaging of dairy animal parts by using only a single camera and applying stereometry. Similarly, the amplitude is preferably at least 0.1 mm, more preferably at least 0.25 mm, to bring about a useful shift between captured images. But even with such small amplitudes, a reasonable improvement of the image quality is visible. Note also that such a range of useful amplitudes is completely out-of-scope of US2012/0274243, where such amplitudes would likely lead to the destruction of the optical component, if such amplitude could be achieved at all.

In an embodiment, a frequency of the reciprocating movement is within the range of 0.25-20 Hz, preferably within the range of 0.5-5 Hz. In this frequency range the illuminating unit and/or 3D camera sensor is moved quickly enough to have an improving effect on the image quality, while at the same time the movement itself will not disturb the camera too much, or exert too much mechanical stress. Again, these frequencies are much lower than used in US2012/0274243, where frequencies of more than 100 kHz are used.

In an embodiment, the mover device comprises an inactive state in which the mover device does not move at least one of the at least two componentswith a reciprocating movement and an active state in which the mover device moves at least one of the at least two components with a reciprocating movement. Of course, the mover device may also be arranged to move the 3D camera device as a whole, or not, respectively, in the active state, the inactive state, respectively. The camera system may be configured to bring the mover device from the inactive state to the active state when the position of the object cannot be properly identified with the camera device when the mover device is in the inactive state. For example, if connecting the teat cup does not succeed within a set timeframe, or if it is not at all possible to determine a teat or other animal part in the 3D image, the mover device may be switched from the inactive state to the active state.

In the absence of any contamination, the camera system may function well without the reciprocating movement. Therefore, it is not always required to move the 3D camera device, or a component thereof, in a reciprocating movement, but only when the camera system is not able to create a 3D image with sufficient quality due to contamination on the 3D camera device. According to this embodiment, the mover device can be maintained in the inactive state as long as a 3D image of the object can be created with sufficient quality. If not, the mover device can be brought to the active state.

Any mover device may be used to move the 3D camera device or a component thereof in a reciprocating movement. In an embodiment, the mover device may comprise a support to movably support at least one of the at least two components, in particular the 3D camera device as a whole, to allow movement of the at least one of the at least two components, in particular the 3D camera device as a whole, in a direction of the reciprocating movement, and a mover element configured to move the at least one of the at least two components, in particular the 3D camera device as a whole, in the reciprocating movement. Herein, the support may be movably connected to the "fixed world", e.g. via a swivel joint, a spring or a pendulum construction.

In an embodiment, the mover element is a pusher configured to periodically push at least one of the at least two components, in particular the 3D camera device as a whole, in the direction of the reciprocating movement. The pusher may for example have the form of a pusher element which is alternately extended and retracted in the direction of the reciprocating movement, or an eccentric element arranged on a rotating axle, or any other suitable device. The pusher may comprise e.g. an oscillator that imparts the reciprocating movement. Herein, the oscillation may be harmonic, or have any other shape, such as a sawtooth, a square wave and so on.

The support and the mover means mentioned here may also use the inherent deformability of any system. As long as this remains within the elastic range, any periodic deformation will cause a reciprocating movement. Therefore, the camera system device may also comprise an external mover means arranged to impart the reciprocating movement, such as a knocker or beater device. The tapping thus caused may cause sufficient movement if the stiffness of the 3D camera device or component thereof, in particular a housing or a joint, and the force imparted are suitably selected.

In an embodiment, the object is an animal or a part of an animal, in particular a back part or teat of a cow. A camera system according to the invention may effectively be used to obtain real-time 3D images of an animal, such as a cow. In particular, the camera system may be used to identify the position of the cow in a milking box. Knowledge of the position of in particular the back end of a cow is used during automatic connection of teat cups of a milking machine to the teats of the cow in an automatic milking process. The position of the (back end of the) cow may be used to determine the starting position of a robot arm for connecting the teat cup, since the position of the teats with respect to the back end of the cow will not change very much. However, it is not excluded that the animal part concerns an udder or teats in order for the connection to be performed under the direct control of the camera system according to the invention, or that the animal part relates to any other part, such as a leg, e.g. in order to perform any other animal related action.

In some of the above embodiments, the 3D camera device is arranged to project a (structured) light pattern and to capture images containing a reflected pattern. The processing device is arranged to process the captured images into a 3D image, including distance information. This could be done by determining the distortion in the reflected pattern with respect to the original pattern, by assessing differences in intensity, performing stereometry on the reflected pattern taking into account of the original pattern, and so on. The pattern may be regular or irregular, and may comprise lines, curves and/or dots, of darker and lighter areas. Advantageously, the camera device comprises a PrimeSense sensor system produced by the company PrimeSense, Ltd (Tel Aviv, IL) and as marketed in e.g. the Kinect™ by Microsoft Corporation. The claimed features, such as with respect to the amplitude and frequency of the reciprocating movement advantageously apply for this type of camera device. However, the same or other ranges of in particular amplitude and frequency will also hold for other types of camera devices.

The invention further relates to an animal related system with an animal related space arranged to accommodate an animal, in particular a dairy animal, the system comprising an animal related device that is arranged to perform an animal related action on the animal when present in the animal related space, which system comprises a device controller with a camera system according to any preceding claim, wherein the device controller is arranged to control the animal related device for performing the animal related action on the basis of the 3D image as determined by the camera system. The camera system according to the invention is less sensitive to dirt, and therefore, such an animal related system advantageously comprises such a camera system, as animals are apt to soil their environment by means of feed, dung splatters or the like. Thus the animal related system becomes more robust.

In particular, the animal related device comprises a milking robot or a teat treatment device. Such devices need to be able to find the teats of an animal reliably and quickly. However, other animal related devices may also advantageously be comprised in the system. The teat treatment may e.g. relate to a teat spraying device, a premilking device, including teat cleaning and/or stimulation and/or premilking means, or to a teat dipping device.

The invention further relates to a method for obtaining a 3D image of an object, in particular by means of the camera system according to the present invention, the method comprising the steps of:
capturing by a 3D camera device of the camera system images of the object, and
processing by the processing device of the camera system the captured images to determine a 3D image of the object, characterized by
moving at least one of the at least two components of the 3D camera device, in particular the 3D camera device as a whole, with a reciprocating movement during the step of capturing, and in particular with a translating movement.

With this method, the same advantages as described above for the camera system can be achieved. For this reason, not all particular embodiments as described for the camera system will be repeated here. Nevertheless, all specific and additional features mentioned there, or their use, will also apply for the method.

In particular, in an embodiment, the step of moving comprises moving the at least two components of the 3D camera device simultaneously with the same reciprocating movement.

In alternative embodiments or additionally, the method comprises determining the 3D image of the object from the captured images taking into account the reciprocating movement of the at least two components of the 3D camera device.

In an embodiment, the 3D image is used for determining a position of an animal or a part of an animal, in particular a back part or teat of a cow.

An embodiment of a camera system according to the invention will now be described in further detail, by way of example only, with reference to the accompanying drawings, in which.

Figures 1, 2:
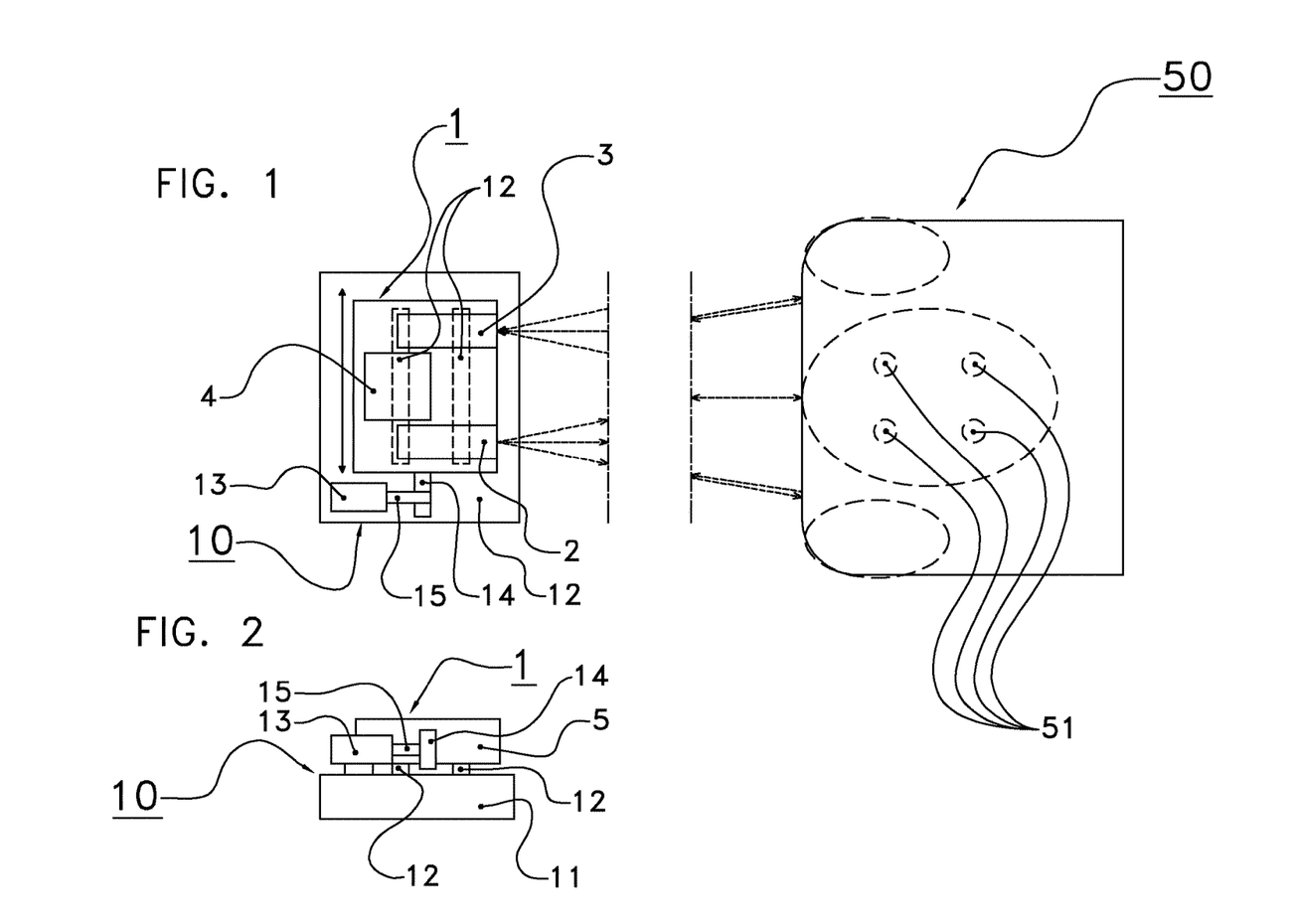
FIG. 1 shows schematically a top view of a camera system arranged to create a 3D image of back end of a cow.
FIG. 2 shows schematically a side view of the camera system of FIG. 1.

FIG. 1 shows a top view of a camera system comprising a camera device 1, a mover device 10 and a back end of a cow 50. FIG. 2 shows a side view of the camera system. The camera device 1 is mounted on the mover device 10 and configured and arranged to create real time 3D images of the back end of the cow 50, in particular of the positions of the teats 51 of the cow 50.

These positions can be used to automatically connect teat cups of an automatic milking device to the teats 51 of the cow 50. However, the camera device 1 may also be used to create a 3D image of other objects, in particular parts of an animal.

The camera device 1 comprises an illuminating unit 2 configured to project light patterns on the back end of the cow 50, and a 2D receiver (sensor) 3 to capture images of the object including reflected light patterns. The projected and reflected light patterns are indicated in FIG. 1 as dashed arrows.

The camera device 1 comprises a processing device 4 to determine a 3D image from the captured images.

The illuminating unit 2, the 2D receiver 3 and the processing device 4 are mounted in a housing 5 of the camera unit 1. The camera device 1 may comprise further parts, such as a color camera and connector devices.

Such 3D camera device per se is for example marketed by Prime Sense Ltd., Tel-Aviv, Israel, and for example described in patent applications WO 2007/043036, WO2007/105205, US2010/0290698, US2010/118123.

The camera device 1 is mounted on the mover device 10. The mover device 10 is configured to move the camera device 1 in a reciprocating movement indicated by a double headed arrow.

It has been found that a reciprocating movement of the camera device 1 with respect to the object of which a 3D image is desired, in this case the teats 51 of a cow 50, may substantially improve the image quality. The image quality may in particular improve in case of contamination of the outer surfaces of the illuminating unit 2 and/or the 2D receiver 3, i.e. the outer surfaces of the camera device 1 through which the light patterns are projected and the reflected light patterns are captured. These outer surfaces may for example be a transparent cover of the housing 5 or final elements, such as lens elements the illuminating unit 2 and/or the 2D receiver 3.

It is noted that the present embodiment comprises an illuminating unit 2 emitting a (speckle) pattern of light as well as a 2D receiver 3, in particular a video camera. However, it is noted that the illuminating unit 2 could also be a second 2D receiver, such as a second video camera. Both 2D receivers now capture an image of the object, here cow 50, and the processing device 4 is then arranged to process the images of both 2D receivers into a 3D image, e.g. by means of stereoscopic calculations, as are known in the art.

The reciprocating movement of the embodiment shown in FIG. 1 is a translating movement in a direction substantially perpendicular to a projection direction of the illuminating unit 2 and a capturing direction of the 2D receiver 3.

The mover device 10 comprises a base frame 11 comprising two guiding elements 12 over which the camera unit 1 may slide in the direction of the reciprocating movement. On the base frame 11, a rotation device 13 is mounted configured to rotate an eccentric cam 14 mounted on an axle 15 of the rotation device 13. The rotation device 13 is for example a rotating electromotor driving axle 15.

The eccentric cam 14 is placed against a side wall of the housing 5, so that by each rotation of the eccentric cam 14 the camera device 1 is pushed in the direction of the reciprocating movement. In this way the reciprocating movement of the camera device 1 is obtained. When needed, a biasing element, such as a spring (not shown), may be provided to bias the camera device 1 towards the cam 14.

Any other device or construction to move the camera device 1 in a reciprocating movement may also be used.

The amplitude of the reciprocating movement is below 5 mm, preferably below 2 mm, and a frequency of the reciprocating movement is within the range of 0.25-20 Hz, preferably within the range of 0.5-5 Hz.

Since the reciprocating movement of the camera device 1 may in particular be of advantage when the outer surfaces of the camera device 1, in particular the outer surfaces of the camera device 1 through which the light patterns are projected and the reflected light patterns are captured, it may not always be necessary to move the camera device 1 in the reciprocating movement.

Therefore, the camera system may be configured to bring the mover device 10 from an inactive state in which the camera device 1 is not moved in a reciprocating movement into an active state in which the camera device 1 is moved in a reciprocating movement, only when the position of the teats 51 cannot be properly identified with the camera device when the mover device 10 is in the inactive state.

Figure 3:
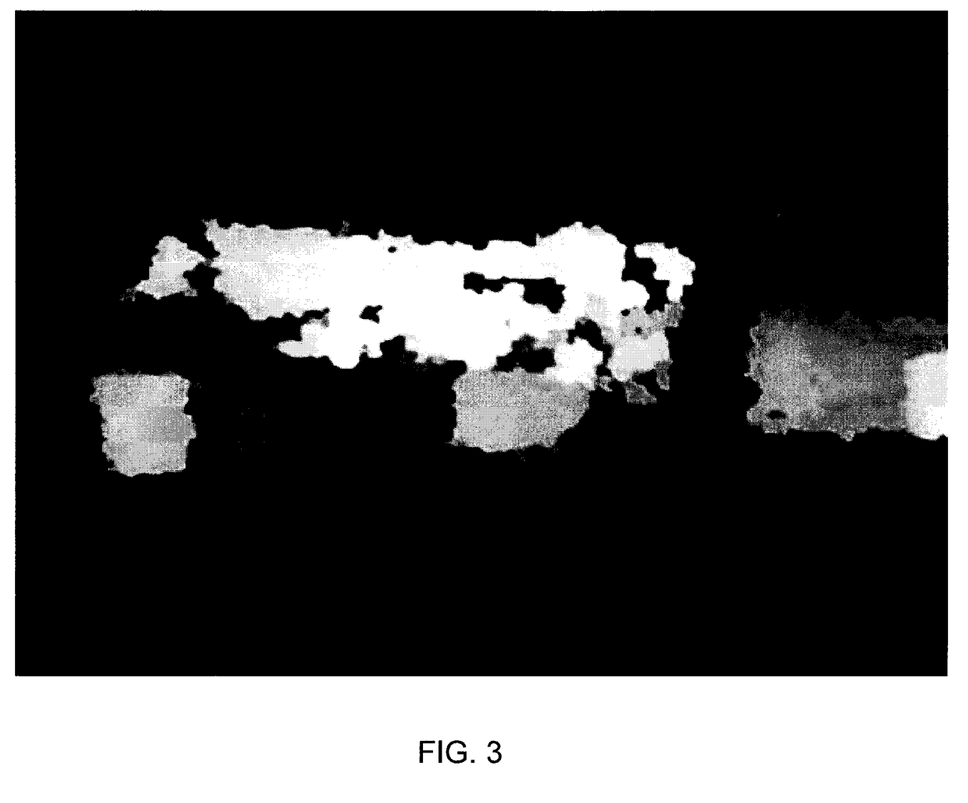
FIG. 3 depicts a 3D image from a camera system without a reciprocating movement.
Figure 4:
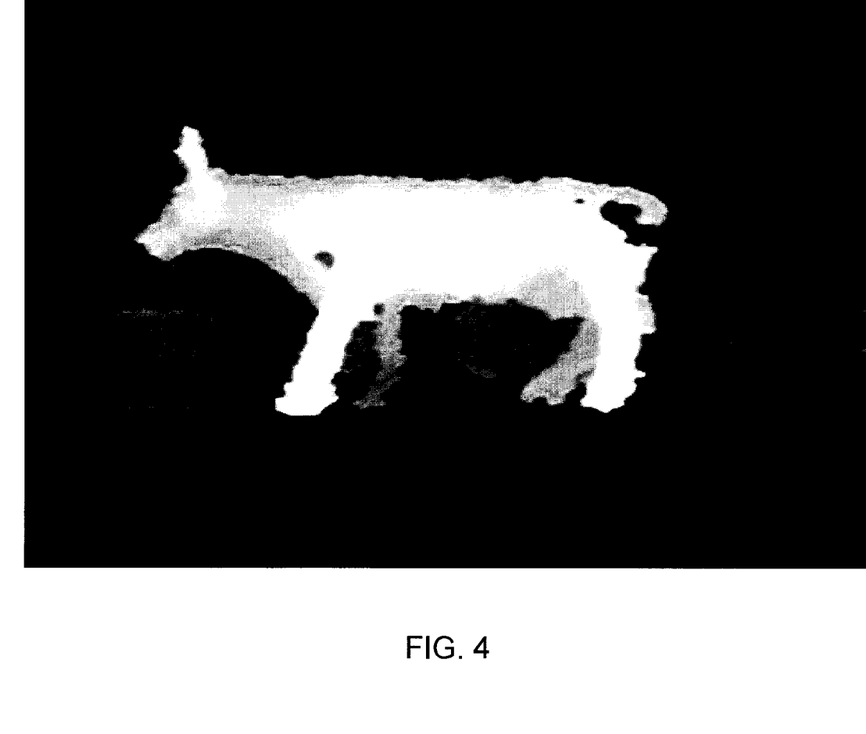
FIG. 4 depicts a 3D image for the same situation, but now with such a reciprocating movement.

FIG. 3 depicts a 3D image from a camera system without a reciprocating movement, while FIG. 4 depicts a 3D image for the same situation, but now with such a reciprocating movement.

In FIG. 3, the camera system used comprised a Kinect camera from the company PrimeSense, Ltd. This image was taken with a high amount of dirt on the camera system, such as would be common when used in a stable, in particular near animals, such as in a milking box. There can hardly be discerned any clear structure or object, due to a lot of noise in the image. It will be clear that such an image cannot lead to a reliable starting position for e.g. teat cup connection.

For FIG. 4, the camera system was set in a reciprocating motion, with a frequency of about 3-4 Hz, and with an amplitude of about 1-2 mm. Now, the scene is much clearer, and a cow in the middle, a bucket in front of the cow and something that resembles a square bale to the right can relatively clearly be seen. With such an improved image quality, it is much more reliable to find e.g. the back end of a cow, as a starting position for the robot arm, or any other desired animal part's position.

Figure 5:
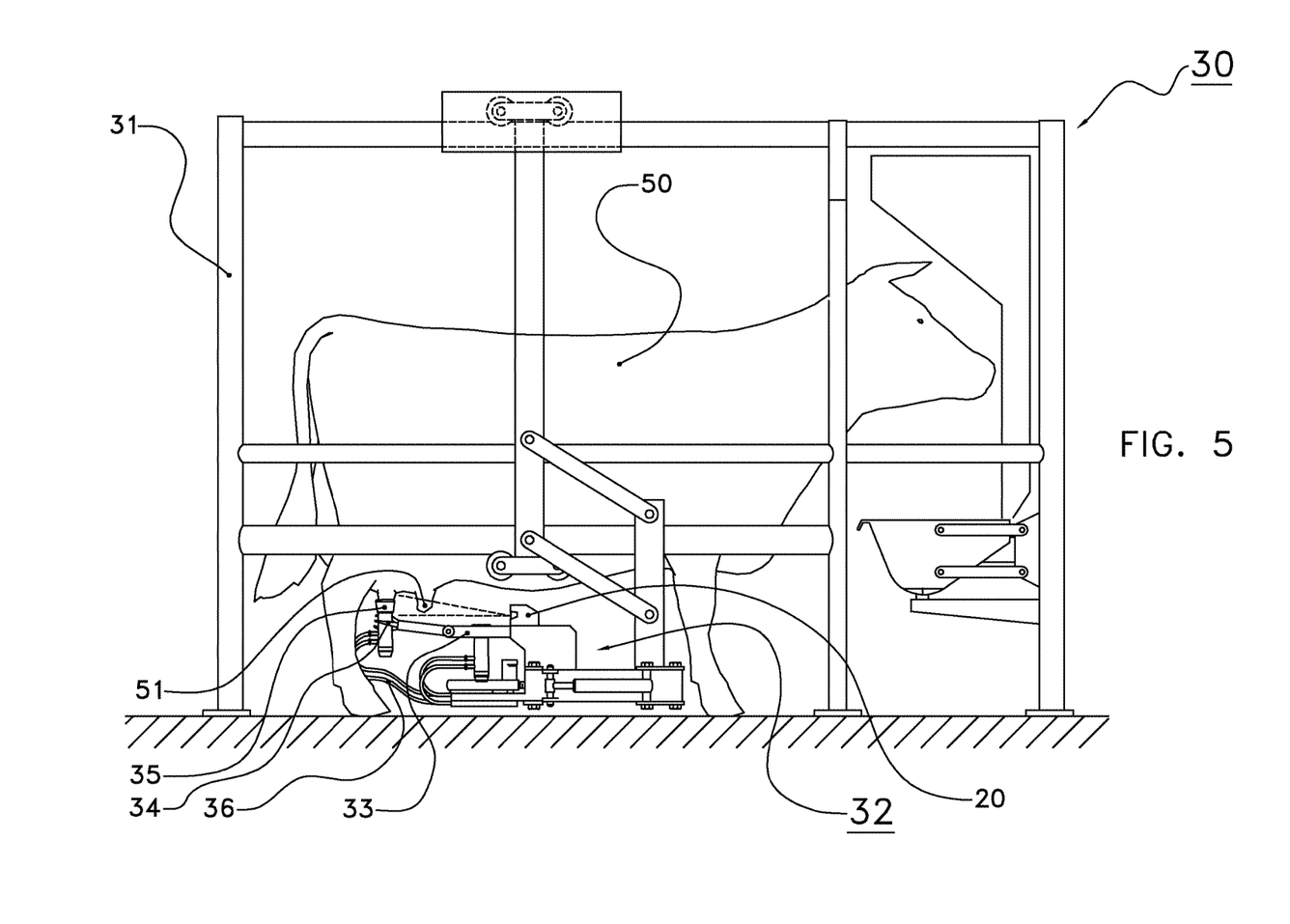
FIG. 5 diagrammatically shows an animal related system according to the invention.

FIG. 5 diagrammatically shows an animal related system 30 according to the invention. The system 30 comprises a milking box 31, a milking robot 32 and a camera system 20 according to the invention.

The animal related system 30 shown here is a milking system, but could also be a preparation system or after milking treatment system, and so on. Here, the system comprises a milking robot 32, with a robot arm 33 with a gripper 34, a teat cup 35 and a milk line 36.

The milking robot 32 is controlled, at least in part for positioning the teat cup 35 onto a teat 51, by means of the camera system 20 according to the invention, that is, as is shown e.g. in FIG. 1. The camera system 20 will determine and generate a 3D image of a back end of the cow 50 to guide the robot arm 33 to a starting position, after which it is guided by means of additional, non-shown means towards the teat 51, or it is guided directly under control of the camera system 20. In any case, the system 30 as a whole will have a larger capacity and throughput due to the more reliable positioning of the robot arm 33 under the control of the camera system 20 according to the invention.

The invention claimed is:

1. A camera system configured to create 3D images of an object, comprising:
    a 3D camera device to capture images of the object;
        wherein the 3D camera device comprises at least two components, a first component comprising a first 2D receiver arranged to capture images of the object, and a second component comprising
        an illuminating unit configured to project light on the object;
    a processing device operatively connected to the 3D camera device and arranged to determine a 3D image from the captured images; and
    a mover device configured to move at least one of the components with a reciprocating movement during capturing of images, wherein the mover device comprises an inactive state in which the mover device does not move at least one of the at least two components with a reciprocating movement, and an active state in which the mover device moves at least one of the at least two components with a reciprocating movement, wherein the camera system is configured to determine whether the object cannot be properly identified with the camera system when the mover is in the inactive state, and wherein the camera system is configured to bring the mover device from the inactive state to the active state when a position of the object cannot be properly identified with the camera system when the mover device is in the inactive state.

2. The camera system of claim 1, wherein the second component comprises an illuminating unit configured to project a light pattern on the object, and wherein the first component is arranged to capture images of the object including a reflected light pattern.

3. The camera system of claim 1, wherein the second component comprises a second 2D receiver, and wherein the processing device is arranged to determine the 3D image by comparing the images from the first 2D receiver with the images from the second 2D receiver.

4. The camera system of claim 1, wherein the mover device is configured to move the first component and the second component simultaneously with a same reciprocating movement, and move the 3D camera device as a whole with the reciprocating movement.

5. The camera system of claim 1, wherein the processing device comprises a data input to receive movement data of the reciprocating movement, and wherein the processing device is configured to determine the 3D image from the captured images and the movement data.

6. The camera system of claim 1, wherein a direction of the reciprocating movement is substantially perpendicular to a projecting direction of the illuminating unit and/or a capturing direction of the first 2D receiver.

7. The camera system of claim 1, wherein an amplitude of the reciprocating movement is below 5 mm, and/or wherein a frequency of the reciprocating movement is within a range of 0.25-20 Hz.

8. The camera system of claim 1, wherein the mover device comprises:
a support to movably support at least one of the at least two components, or the 3D camera device as a whole, to allow movement of the at least one of the at least two components, or the 3D camera device as a whole, in a direction of the reciprocating movement, and
a mover element configured to move the at least one of the at least two components, or the 3D camera device as a whole, in the reciprocating movement.

9. The camera system of claim 8, wherein the mover element is a pusher configured to periodically push the at least one of the at least two components, or the 3D camera device as a whole, in the direction of the reciprocating movement.

10. The camera system of claim 1, wherein the object is an animal or a part of an animal, or a back part or teat of a cow.

11. The camera system of claim 1, wherein the reciprocating movement comprises a translating movement.

12. The camera system of claim 1, wherein an amplitude of the reciprocating movement is below 5 mm and a frequency of the reciprocating movement is within a range of 0.5-5 Hz.

13. The camera system of claim 1, wherein an amplitude of the reciprocating movement is below 2 mm and wherein a frequency of the reciprocating movement is within a range of 0.5-5 Hz.

14. An animal related system with an animal related space arranged to accommodate an animal, or a dairy animal, the system comprising:
an animal related device that is arranged to perform an animal related action on the animal when present in the animal related space;
a device controller with the camera system according to claim 1, wherein the device controller is arranged to control the animal related device for performing the animal related action on a basis of the 3D image as determined by the camera system.

15. The animal related system of claim 14, wherein the animal related device comprises a milking robot or a teat treatment device.

16. A method for obtaining a 3D image of an object, by the camera system according to claim 1, the method comprising:
capturing by the 3D camera device of the camera system images of the object;
processing by the processing device of the camera system the captured images to determine a 3D image of the object; and
moving at least one of the at least two components of the 3D camera device, or the 3D camera device as a whole, with a reciprocating movement during the capturing.

17. The method of claim 16, wherein the moving comprises moving the at least two components of the 3D camera device simultaneously with the reciprocating movement and/or the method comprising determining the 3D image of the object from the captured images taking into account the reciprocating movement of the at least two components of the 3D camera device.

18. The method of claim 17, wherein the 3D image is used for determining a position of an animal or a part of an animal, or a back part or teat of a cow.

19. A camera system configured to create 3D images of an animal or a part of an animal, or a back part or teat of a cow (collectively an object), comprising:
a 3D camera device to capture images of the object;
wherein the 3D camera device comprises at least two components, a first component comprising a first 2D receiver arranged to capture images of the object, and a second component comprising
an illuminating unit configured to project light on the object;
a processing device operatively connected to the 3D camera device and arranged to determine a 3D image from the captured images; and
a mover device configured to move at least one of the components with a reciprocating movement during capturing of images, wherein the mover device comprises an inactive state in which the mover device does not move at least one of the at least two components with a reciprocating movement, and an active state in which the mover device moves at least one of the at least two components with a reciprocating movement, wherein the camera system is configured to determine whether the object cannot be properly identified with the camera system when the mover is in the inactive state, and wherein the camera system is configured to maintain the mover device in the inactive state as long as a 3D image of the object of sufficient quality can be created and the camera device is configured to bring the mover device from the inactive state to the active state when a position of the object cannot be properly identified with the camera system when the mover device is in the inactive state.

* * * * *